US012812339B2

(12) United States Patent
Weston et al.

(10) Patent No.: US 12,812,339 B2
(45) Date of Patent: Nov. 24, 2026

(54) HALF-DUPLEX AFTERMARKET RADIO INTEGRATION IN MOTOR VEHICLES

(71) Applicant: FORD GLOBAL TECHNOLOGIES, LLC, Dearborn, MI (US)

(72) Inventors: Keith Weston, Canton, MI (US); John R. Van Wiemeersch, Novi, MI (US); Brendan F. Diamond, Naples, FL (US); Chris M. Paiva, Novi, MI (US); Stuart C. Salter, White Lake, MI (US); Thomas J. Hermann, Troy, MI (US)

( * ) Notice: Subject to any disclaimer, the term of this patent is extended or adjusted under 35 U.S.C. 154(b) by 253 days.

(21) Appl. No.: 18/888,470

(22) Filed: Sep. 18, 2024

(65) Prior Publication Data

US 2026/0082183 A1 Mar. 19, 2026

(51) Int. Cl.
*H04W 4/10* (2009.01)
*H04B 1/3822* (2015.01)

(52) U.S. Cl.
CPC ............ *H04W 4/10* (2013.01); *H04B 1/3822* (2013.01)

(58) Field of Classification Search
CPC .......... H04W 4/10; H04B 1/3822; H04B 1/44
See application file for complete search history.

(56) References Cited

U.S. PATENT DOCUMENTS

| | | | | |
|---|---|---|---|---|
| 5,317,249 | A * | 5/1994 | Ford | H02J 7/865 320/160 |
| 5,881,370 | A * | 3/1999 | Pottala | H04B 1/44 455/552.1 |
| 6,970,727 | B1 * | 11/2005 | Klein | H04B 1/3877 455/575.2 |
| 7,254,420 | B1 * | 8/2007 | Klein | H04M 1/6058 455/569.1 |
| 8,078,120 | B2 | 12/2011 | Sandoval et al. | |
| 8,473,012 | B2 | 6/2013 | Varela et al. | |
| 11,909,924 | B1 * | 2/2024 | Mealancon | H04M 9/001 |
| 2013/0137415 | A1 | 5/2013 | Takikawa | |
| 2014/0357248 | A1 | 12/2014 | Tonshal et al. | |
| 2014/0368475 | A1 | 12/2014 | Spahl et al. | |
| 2018/0007480 | A1 * | 1/2018 | Dieringer | B60R 11/00 |
| 2018/0234812 | A1 * | 8/2018 | Morse | H04L 5/16 |
| 2023/0300742 | A1 * | 9/2023 | He | H04W 52/0216 370/311 |

OTHER PUBLICATIONS

Oxbow Renegade X, Instruction Manual, oxbowgear.com.
GME Pty Ltd., XRS-BT1, XRS™ Connect Bluetooth® Interface Module & Wireless PTT, gme.net.au.

* cited by examiner

*Primary Examiner* — Lewis G West
(74) *Attorney, Agent, or Firm* — Frank Lollo; Eversheds Sutherland (US) LLP

(57) ABSTRACT

An aftermarket two-way mobile radio transceiver incorporating a push-to-talk activator for selecting a transmitting mode or a receiving mode is installed in a vehicle. When a driving state of the vehicle is detected, the push-to-talk activator is inhibited. A discontinuous trigger action of a user may be corresponding to a selection of the transmitting mode or the receiving mode using a user input component separate from the two-way transceiver. Selection of the transmitting mode sets a latch to continuously generate a first PTT signal to the aftermarket transceiver. A subsequent selection of the receiving mode resets the latch to discontinue the first PTT signal.

20 Claims, 5 Drawing Sheets

HALF-DUPLEX AFTERMARKET RADIO INTEGRATION IN MOTOR VEHICLES

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to two-way radio installations in motor vehicles, and, more specifically, to novel approaches for controlling and utilizing half-duplex two-way radios via vehicle-based human machine interfaces.

Two-way wireless radio communication systems using shared channels in allocated radio spectrum are popular with many users and have many important functions. In addition to non-licensed citizens band (CB) radios and walkie-talkies, there are licensed radio services such as public safety (e.g., police, fire, and medical) systems, industrial/business systems, and the General Mobile Radio Service (GMRS). Since vehicle manufacturers do not offer two-way transceivers as optional equipment integrated with a vehicle, vehicle owners wanting a two-way radio transceiver attached to their vehicle will typically obtain it as an aftermarket installation.

A transceiver for two-way radio is typically half duplex, wherein the transceiver operates by default in a receive mode until the user activates a transmit mode by continuously pressing a push-to-talk (PTT) switch. A PTT activator switch may usually be a push button located on a handset or on a wired microphone/speaker unit. Some transceivers are configured to work with wireless PTT buttons or to be controlled via an application on a smartphone which is wirelessly linked to the transceiver (e.g., using Bluetooth®). Particularly with a smartphone interface, the PTT switch may be a "soft" switch on a touchscreen. Once the user releases a PTT switch, the transceiver returns to the receiving (i.e., "listen") mode.

Operation of communications devices in moving vehicles may be regulated. In some jurisdictions, for example, use by a driver of a vehicle may be limited to handsfree operation. Even if not regulated, a driver may prefer handsfree operation. Known handsfree operation (e.g., for cellphone use) typically involves using the built-in transducers (speakers and microphones) of a vehicle to reproduce and to detect audible sounds comprising the contents of the communication. The audio signals and various control parameters may be wirelessly exchanged between the cellphone and the vehicle (e.g., using Bluetooth®). However, cellphone operation is full duplex. No push-to-talk function is necessary since two separate wireless channels are utilized in cellular communication (one to convey audio signals in each direction). Thus, known methods of wireless linking cannot enable handsfree operation for a half-duplex transceiver.

SUMMARY OF THE INVENTION

Along with the wireless linkage between an accessory (e.g., aftermarket) two-way radio for sending audio signals between the microphone and speakers of the vehicle and the two-way radio transceiver, the invention further provides wireless remote control via a vehicle human-machine interface (HMI) to the two-way radio transceiver, thereby enabling handsfree activation and disabling of a push-to-talk function of a half-duplex transceiver. Instead of a continuous action for obtaining a transmit mode and overriding a default receive mode, the invention employs a discontinuous trigger action by the user which involves a momentary stimulus to the HMI for switching from one transmit/receive mode to the other.

A trigger action may be a spoken utterance (i.e., voice or speech commands or wake words) such as RADIO, COMMS, COPY, OVER, or OUT. A trigger action may be a manual action such as a button press on a touchscreen display (e.g., a dedicated PTT toggle switch, separate button areas for transmit and receive, or combinations of soft buttons). The need for a continuous action to engage the transmit mode can be handled electronically between the vehicle HMI/controller and the transceiver. The transceiver mode which is active can be identified by a message or status indicator shown on the touchscreen display, for example. Incoming speech could be automatically transcribed into text (and/or translated between languages) by a vehicle controller and displayed to the user on the display.

When the two-way transceiver is configured to accept a suitable control signal, a vehicle controller may automatically inhibit use of a manual PTT control element on the transceiver (at least by the driver). When the vehicle is determined to be in a nondriving state (e.g., stationary in a legal parking location or having a gear selector in a PARK position while in a suitable off-road location), the vehicle controller may allow use of the PTT button on the two-way radio transceiver.

In the event that a crisis situation arises in a vehicle in which a vehicle occupant may become unable to initiate any PTT commands (either manual or spoken), then some embodiments of the invention may automatically initiate a transmitting mode of the two-way radio transceiver. This would enable a remote party monitoring the communication channel to listen in on the situation (including any speaking by vehicle occupants). An automated announcement can be added to the transmission informing the remote party of an event leading to the detection of a crisis situation. The vehicle controller may periodically alternate between the transmitting mode and the receiving mode to achieve a level of two-way communication without relying on a user generated PTT signal.

In some embodiments, a smartphone or other mobile wireless device of a vehicle occupant can be paired with the vehicle and used in conjunction with the two-way radio transceiver to provide a microphone and speaker for the two-way audio utterances (as well as providing an HMI for generating PTT signals). Since the smartphone can remain linked to the vehicle controller while outside the vehicle, use of the two-way radio transceiver can likewise be maintained from outside the vehicle.

In one aspect of the invention, a vehicle is configured for operating with an aftermarket two-way mobile radio transceiver which is connected to the vehicle, wherein the mobile radio transceiver incorporates a push-to-talk activator for selecting a transmitting mode or a receiving mode of the mobile radio transceiver. A user input component is adapted to detect a discontinuous trigger action of a user corresponding to a selection of the transmitting mode or the receiving mode. A latch provides a first PTT signal to the mobile radio transceiver to select the transmitting mode. A logic controller is adapted to link with the mobile radio transceiver. The logic controller is configured for (1) detecting a driving state of the vehicle, (2) when the driving state is detected then inhibiting the push-to-talk activator, (3) when the driving state is detected then obtaining the selection of the transmitting mode or the receiving mode from the user input component, (4) setting the latch to continuously provide the first PTT signal after the selection of the transmitting mode is obtained from the user input component, and (5) resetting the latch to discontinue the first PTT signal after the selection of the receiving mode is obtained from the user input component.

DETAILED DESCRIPTION OF PREFERRED EMBODIMENTS

Figure 1:
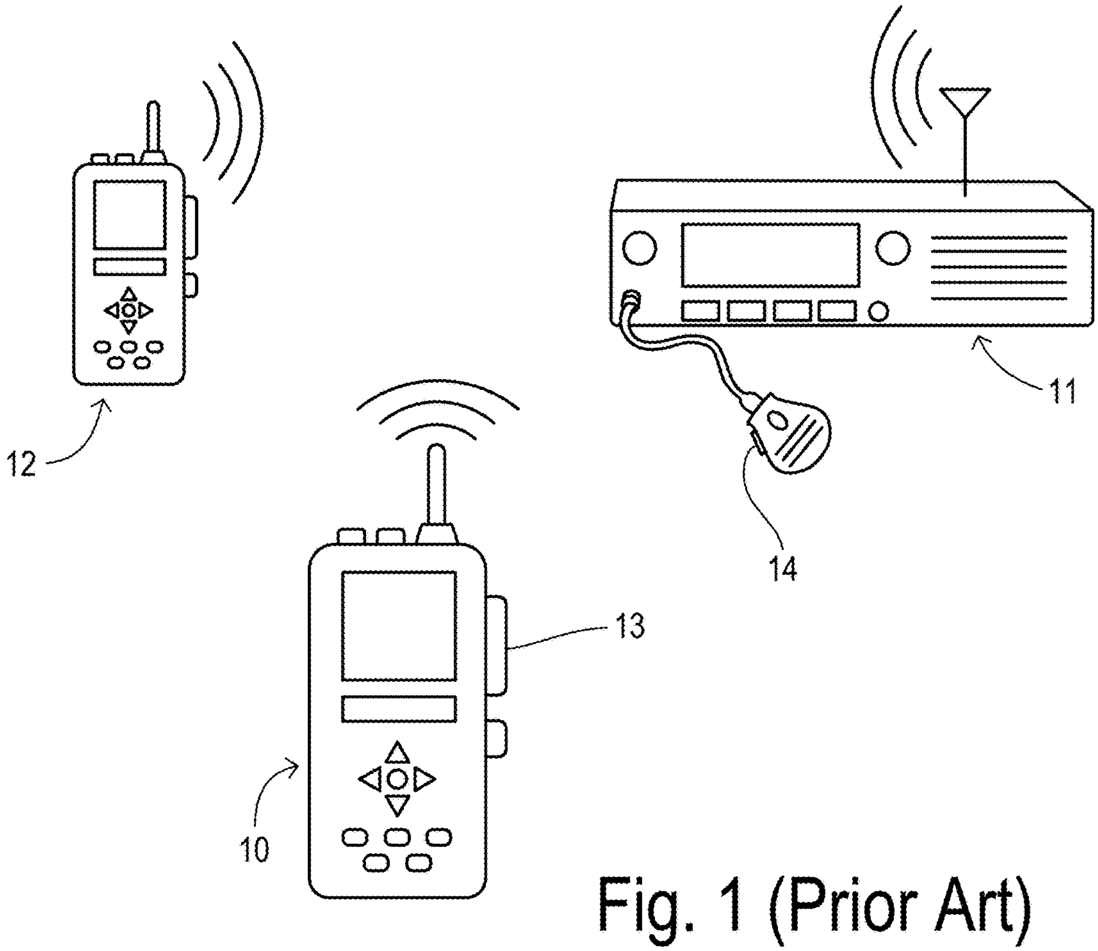
Fig. 1 (Prior Art)
FIG. 1 is a schematic diagram illustrating a two-way, half-duplex radio transceiver systems.

Referring to FIG. 1, a plurality of two-way radio transceivers for communicating over licensed or non-licensed radio services include a handheld transceiver 10, a transceiver station 11 (either fixed or mobile), and another handheld mobile transceiver 12. To provide half duplex communication using a shared radio channel, transceiver 10 has a PTT pushbutton 13 which is pressed by a user when talking and is then released in order to listen to others speaking over the shared channel. Transceiver 11 uses a wired microphone/speaker unit having a PTT button 14. In particular, transceiver 11 may be a type which is adapted for aftermarket installation into a vehicle interior, such as a P25-compatible digital two-way transceiver.

Figure 2:
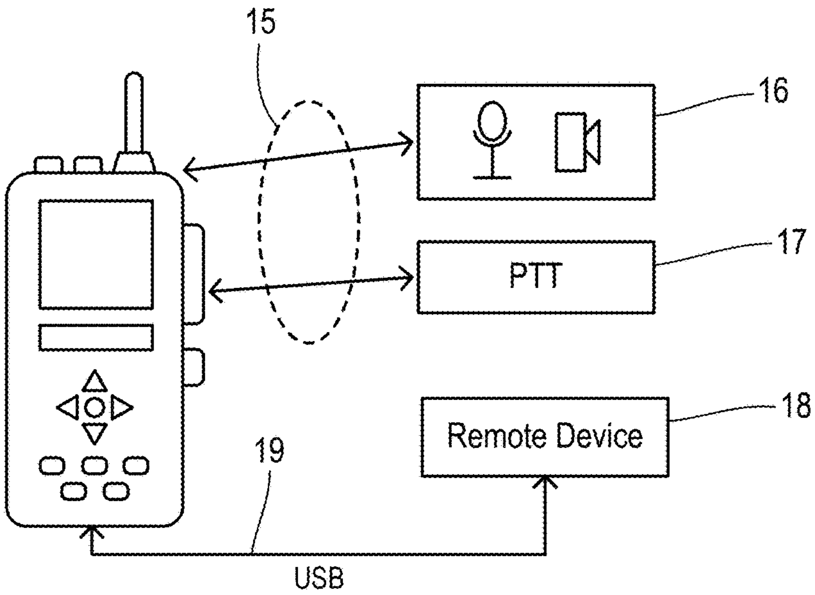
Fig. 2 (Prior Art)
FIG. 2 is a schematic diagram showing a two-way transceiver operable with wireless accessories.

Transceivers may be adapted to operate wirelessly with other accessories in order to provide flexible and convenient operation. As shown in FIG. 2, a wireless link 15 (such as a Bluetooth® connection) may exchange audio signals between a two-way radio transceiver and an audio system 16. A microphone and speaker in audio system 16 can pick up local audio signals during a transmitting mode and generate received audio signals in a receiving mode. Link 15 can also interconnect the two-way transceiver with a remote push-to-talk device 17 configured to replicate a PTT signal without requiring interaction with the main transceiver unit. In addition, a two-way radio transceiver may be configured with a USB interface 19 for interacting with a remote device 18 such as a PTT controller and/or audio devices.

Figure 3:
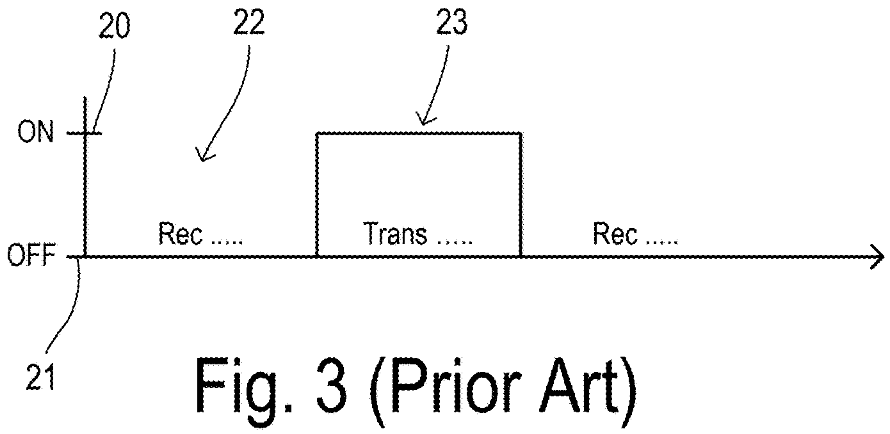
Fig. 3 (Prior Art)
FIG. 3 is a functional diagram showing half-duplex operation of a two-way transceiver.

FIG. 3 shows the operation of PTT signals which alternate between a PTT ON state 20 and a PTT OFF state 21. In the OFF state, the transceiver is in a receiving mode during an interval 22. When the PTT signal transitions to the ON state, then the transceiver enters a transmitting mode during an interval 23. Once the PTT signal is no longer driven to the ON state, then the transceiver returns by default to the receiving mode.

Figure 4:
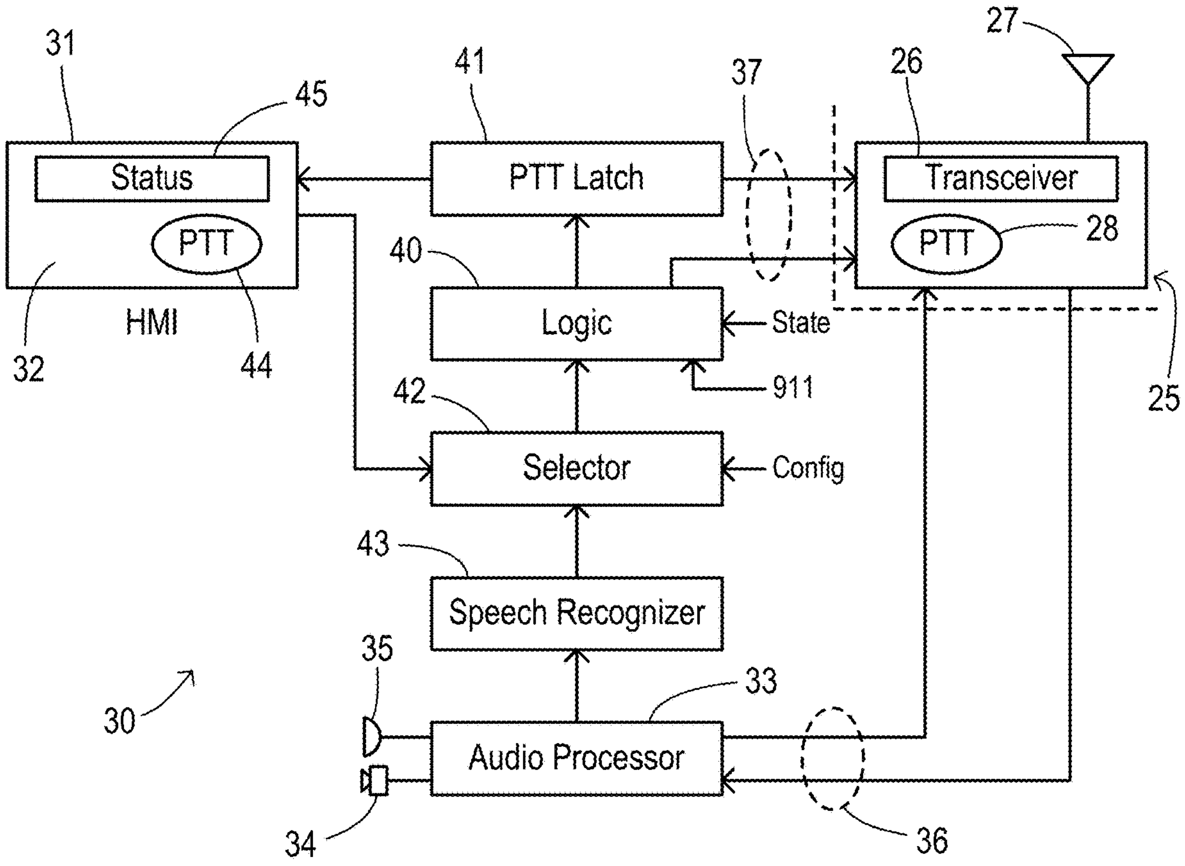
FIG. 4 is a block diagram showing vehicle apparatus according to one embodiment of the invention.

FIG. 4 illustrates an aftermarket, vehicle installation of a two-way radio transceiver achieving hands-free operation using suitably configured vehicle components. An aftermarket two-way radio unit 25 includes a transceiver 26 coupled with a hidden antenna 27 and a push-to-talk activator 28. In addition to wireless communication channels using the two-way radio service of aftermarket unit 25, local connections can be made with a vehicle system 30 using wireless networking (e.g., Bluetooth®) or a wired interface (e.g., USB). Vehicle system 30 may preferably include a human machine interface (HMI) 31 having a touchscreen display 32 and an audio system with an audio processor 33, microphone 34, and speaker 35. Audio processor 35 has a linkage 36 with aftermarket unit 25 for exchanging audio signals corresponding to received audio from transceiver unit 25 and generating audio signals to be transmitted by transceiver unit 25.

Transceiver unit 25 has another link 37 with vehicle system 30 to exchange control signals with a logic controller 40 and a PTT latch 41. In the illustrated embodiment, a selector 42 is provided in order to allow a user (or administrator or custodian of the vehicle) to select the sources to be used for receiving user actions which will be used to select either the initiation or the termination of a PTT command. In particular, a user may designate an input component to be monitored for detecting user actions to start and/or stop a transmitting mode such as hard or soft buttons responsive to user touch in HMI 31 and/or spoken utterances obtained through audio processor 33 and monitored by a speech recognizer 43. Speech recognizer 43 is configured to detect selected words (e.g., "Radio," "Comms," "Begin," "Over," or "Out") to start and stop a first (latched) PTT signal. Selector 42 may receive a configuration signal that is provided during installation of aftermarket unit 25 or generated by a user during a set up routine, for example. When allowed by a current vehicle state (e.g., two-way function is active), a PTT button 44 may be generated on touchscreen 32 in order to receive a manual user action (such as a brief button press) to toggle between transmitting mode and receiving mode. Preferably, a PTT status bar 45 may be shown on the display portion of touchscreen 32 in order to inform the user which of the transmission mode or receiving mode is currently active. The user actions to start or end a PTT ON signal are a discontinuous, momentary action requiring very minimal attention of a driver.

Logic controller 40 may receive information concerning various vehicle parameters (such as vehicle speed, vehicle location, and gear selector position) when determining a vehicle state. Based on the parameters, a driving state or a non-driving state can be detected in order to accordingly inhibit use of the PTT activator incorporated in aftermarket transceiver unit 25 when driving. The driving or non-driving state can also be used to activate monitoring of the user input component (i.e., speech recognizer or vehicle-based PTT button) to provide hands-free remote control of the PTT signal at the appropriate times.

When logic controller 40 is monitoring the user input components for user actions to select between the transmitting mode or the receiving mode of the two-way transceiver, a current state of a PTT signal is latched in PTT latch 41. When a user action indicates a user selection of the transmitting mode, then PTT latch 41 is set to a value that continuously provides a first PTT signal (PTT ON signal)

which is conveyed to and recognized by aftermarket transceiver unit 25. Without further user action, transceiver 26 remains in the transmitting mode. When the user desires to again listen to others on the communication channel, then another action is taken on the user input component to identify the selection of the receiving mode (such as briefly pressing the PTT button on the display panel or uttering "Over"). When the user action for selecting the receiving mode is detected by logic 40, then PTT latch 41 is reset so that the first PTT signal is discontinued. In some embodiments, aftermarket transceiver 25 responds to the absence of the first PTT signal by returning to the default receiving mode. In some embodiments, the reset state of PTT latch 41 may initially generate a second value of the PTT signal which causes transceiver 25 to enter the receiving mode.

Logic 40 controller may further receive a crisis signal which is generated in response to an event which could require 911 or first responder services (e.g., a traffic incident or a spoken utterance requesting such services). In that event, logic controller 40 may alternately activate and deactivate a first PTT signal using PTT latch 41, as described in greater detail below.

Figure 5:
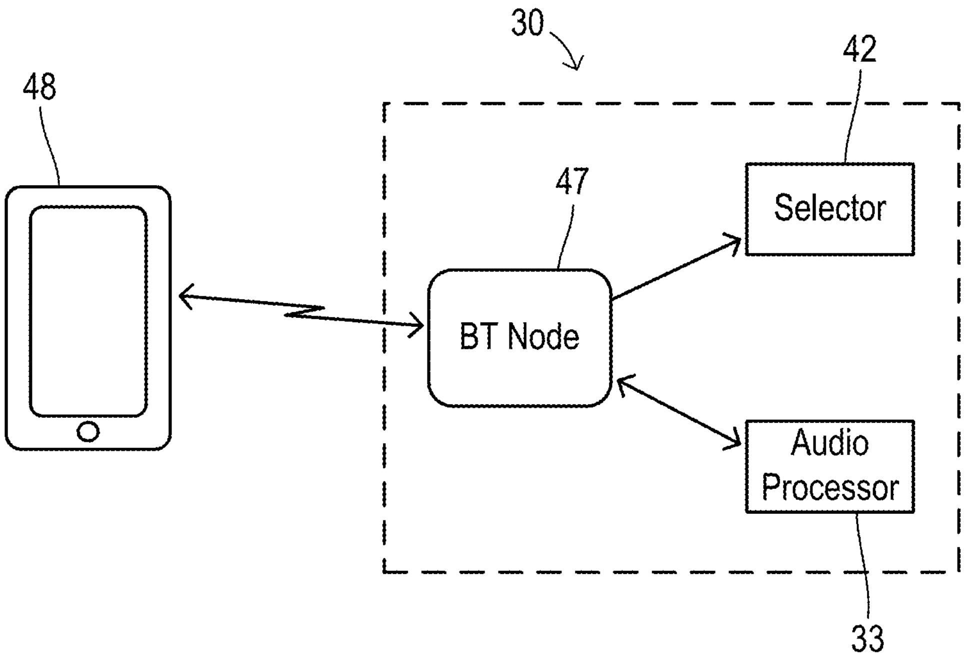
FIG. 5 is a block diagram showing interfacing of a user's wireless mobile smartphone with the vehicle apparatus of FIG. 4.

FIG. 5 shows a Bluetooth® node 47 in vehicle system 30 coupled to selector 42 and audio processor 33. Node 47 provides a link to wireless mobile devices such as a smartphone 48 with a corresponding software app which can be used by a vehicle occupant to exchange audio (e.g., microphone and speaker) signals and control signals according to push-to-talk start and stop actions performed with smartphone 48. Since the effective range for wireless communication between node 47 and smartphone 48 extends beyond the vehicle, two-way communications via the aftermarket transceiver unit can continue to be utilized while outside the vehicle.

Figure 6:
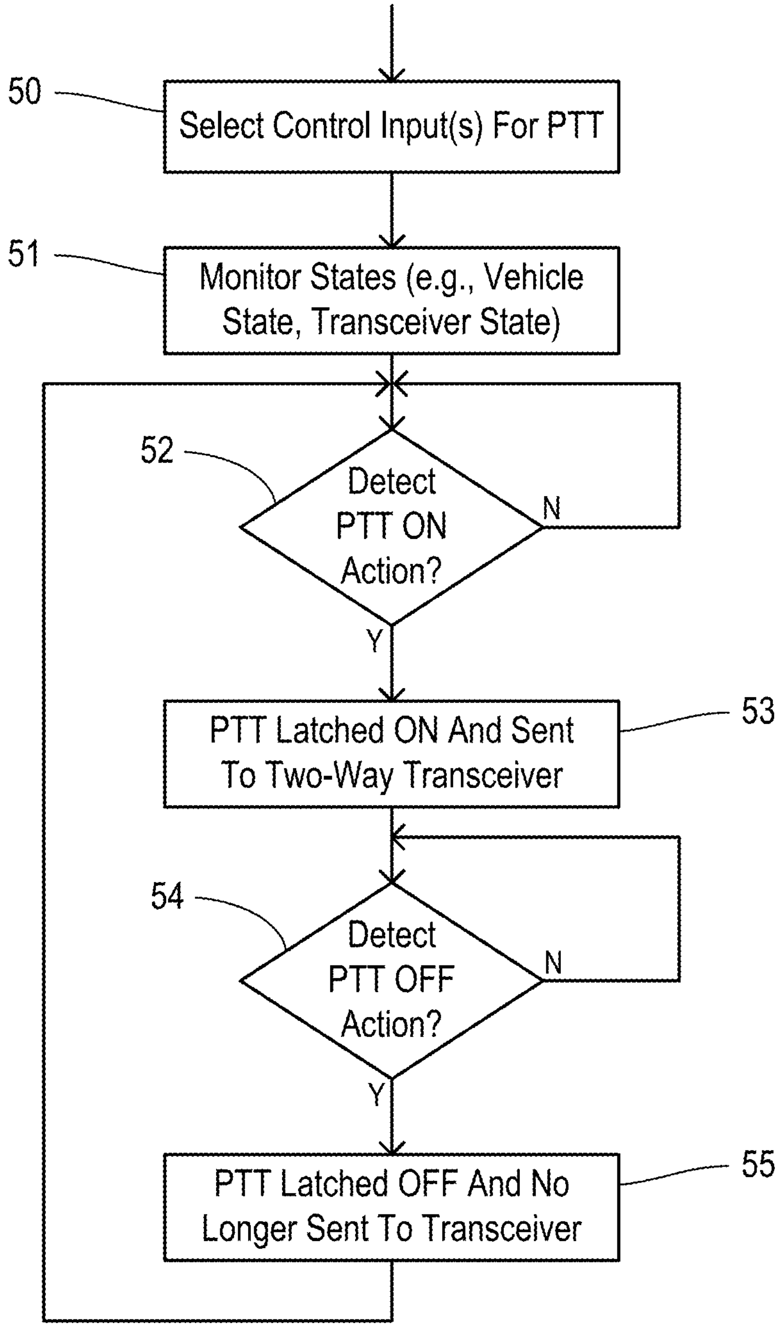
FIG. 6 is a flowchart showing a first method of the invention.

A main method of the invention is shown in FIG. 6 wherein user control inputs for performing the selection actions relating to starting and stopping of a PTT signal are configured in step 50. Thereafter, various states are monitored in step 51 including vehicle states of driving or nondriving, and transceiver states such as transmitting mode or receiving mode. A check is performed in step 52 to determine whether a PTT ON action has been detected. Once the PTT ON action occurs then a PTT signal is latched to an ON value and the latched value is sent to the two-way transceiver in step 53. With the transceiver in the transmitting mode, a check is performed in step 54 to determine whether a PTT OFF action has occurred. These actions can include an utterance of the word "Over" or a brief press on a PTT button. Once a PTT OFF action occurs, then a signal from the PTT latch is reset to an OFF value. With the latched value being OFF, a PTT ON signal is no longer sent to the transceiver in step 55. In some embodiments, the lack of a PTT ON signal is enough to put the two-way transceiver into the default receiving mode. In other embodiments, a distinct PTT OFF signal can be transmitted based on the needs of the two-way transceiver. With the transceiver in the receiving mode, a return is made to step 52 to wait for a subsequent PTT ON action.

Figure 7:
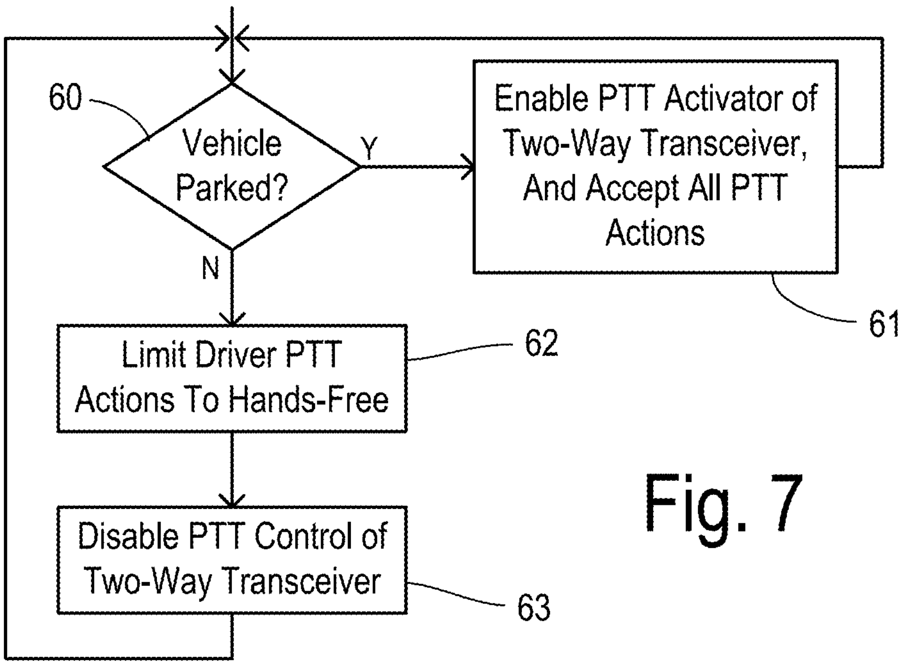
FIG. 7 is a flowchart showing further details of another method of the invention.

Preferably, a driving or nondriving state of the vehicle may be used to configure which of the possible PTT inputs (e.g., the PTT activator button of the two-way transceiver or the vehicle-based user input components) are recognized. A corresponding method is shown in FIG. 7. In step 60, a check is performed to determine whether the vehicle is in a non-driving state (e.g., in a parked condition). If in the nondriving state, then the activator button on the two-way transceiver may be enabled and all PTT actions may be accepted from either the vehicle controllers or the aftermarket transceiver unit in step 61. When step 60 instead detects a driving state, then initiation by a driver of changes in the transmit/receive mode in the two-way transceiver is limited to hands-free PTT actions in step 62. Preferably, PTT controls on the two-way receiver itself are also disabled in step 63. These limits continue on until a nondriving mode is detected in step 60.

Figure 8:
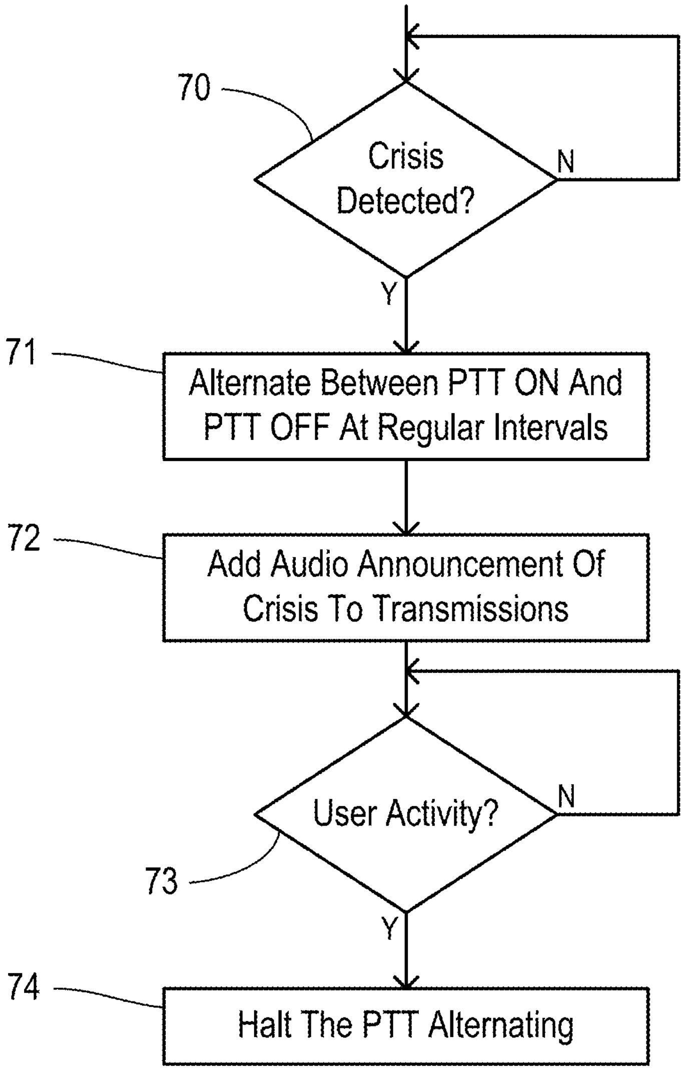
FIG. 8 is a flowchart showing another method of the invention providing an automatic push-to-talk function during a crisis condition.

A method of handling the crisis situation is shown in FIG. 8. A check is performed in step 70 to determine whether a crisis situation has been detected in a proximity of (i.e., inside or nearby) the vehicle. Once a crisis situation exists (e.g., a first responder may be needed), then a vehicle controller alternates between PTT ON and PTT OFF signals at regular intervals in step 71 so that when a user is currently unable to perform the desired PTT on or off actions they can still alternately talk and listen via the two-way channel. In step 72, an audio announcement of the crisis may be automatically added to the transmissions during the transmitting mode in order to inform any listening remote parties of the crisis situation. In step 73, checks are performed using various vehicle inputs (such as an audio microphone or other monitoring devices and switching elements) to detect any user activity indicative that the user is no longer incapacitated and would be able to perform the PTT actions if desired. If such activity is detected, then the alternating of the PTT ON and PTT OFF signals is halted in step 74.

What is claimed is:

1. A vehicle configured for operating with an aftermarket two-way mobile radio transceiver which is connected to the vehicle, wherein the mobile radio transceiver incorporates a push-to-talk activator for selecting a transmitting mode or a receiving mode of the mobile radio transceiver, the vehicle comprising:

a user input component adapted to detect a discontinuous trigger action of a user corresponding to a selection of the transmitting mode or the receiving mode;

a latch for providing a first PTT signal to the mobile radio transceiver to select the transmitting mode; and a logic controller adapted to link with the mobile radio transceiver and configured for (1) detecting a driving state of the vehicle, (2) when the driving state is detected then inhibiting the push-to-talk activator, (3) when the driving state is detected then obtaining the selection of the transmitting mode or the receiving mode from the user input component, (4) setting the latch to continuously provide the first PTT signal after the selection of the transmitting mode is obtained from the user input component, and (5) resetting the latch to discontinue the first PTT signal after the selection of the receiving mode is obtained from the user input component.

2. The vehicle of claim 1 wherein the driving state includes a drivetrain of the vehicle being engaged for movement, wherein the logic controller further detects a nondriving state which includes the vehicle being parked, and wherein the push-to-talk activator is not inhibited when the nondriving state is detected.

3. The vehicle of claim 2 wherein when the logic controller detects the nondriving state then the logic controller further sets the latch and resets the latch according to the selection of the transmitting mode or the receiving mode from the user input component.

4. The vehicle of claim 1 wherein resetting the latch further comprises providing a second PTT signal from the latch to the mobile radio transceiver to select the receiving mode.

5. The vehicle of claim 1 further comprising:
a microphone;
at least one loudspeaker; and
an audio processor coupled to the microphone and the loudspeaker, wherein the audio processor is adapted to link with the mobile radio transceiver in order to reproduce a received audio signal from the mobile radio transceiver using the loudspeaker when in the receiving mode and in order to generate a transmission audio signal for the mobile radio transceiver using the microphone when in the transmitting mode.

6. The vehicle of claim 1 wherein the logic controller is further configured for:
detecting a predetermined crisis condition in a proximity of the vehicle;
alternately setting and resetting the latch at a predetermined time interval while the predetermined crisis condition continues; and
including an audio announcement message identifying the predetermined crisis condition in the transmitting mode of the mobile radio transceiver.

7. The vehicle of claim 6 wherein the logic controller is further configured for detecting a user activity indicative of an ability to take the discontinuous trigger action with the user input component and accordingly halt the alternately setting and resetting the latch.

8. The vehicle of claim 1 wherein the user input component is comprised of a touchscreen display panel, and wherein the touchscreen display panel displays an indication of the setting or resetting of the latch in order to identify the transmitting mode or the receiving mode of the mobile radio transceiver.

9. The vehicle of claim 1 wherein the user input component is comprised of a speech recognizer receiving the discontinuous trigger action of the user as a spoken utterance.

10. The vehicle of claim 1 further comprising:
an audio processor adapted to link with a mobile smartphone of the user using a local wireless connection, wherein the mobile smartphone includes a microphone and a loudspeaker, and wherein the mobile smartphone reproduces a received audio signal from the mobile radio transceiver using the loudspeaker when in the receiving mode, and wherein the mobile smartphone generates a transmission audio signal for the mobile radio transceiver using the microphone when in the transmitting mode;
wherein the logic controller is further adapted to link with the mobile smartphone of the user using a local wireless connection, wherein the mobile smartphone includes a touchscreen display panel functioning as a second user input component to receive the discontinuous trigger action of the user for selecting the transmitting mode of the transceiver.

11. A vehicle comprising:
an aftermarket two-way mobile radio transceiver which is connected to the vehicle, wherein the mobile radio transceiver incorporates a push-to-talk activator for selecting a transmitting mode or a receiving mode of the mobile radio transceiver;
a user input component adapted to detect a discontinuous trigger action of a user corresponding to a selection of the transmitting mode or the receiving mode;
a latch for providing a first PTT signal to the mobile radio transceiver to select the transmitting mode; and
a logic controller adapted to link with the mobile radio transceiver and configured for (1) detecting a driving state of the vehicle, (2) when the driving state is detected then inhibiting the push-to-talk activator, (3) when the driving state is detected then obtaining the selection of the transmitting mode or the receiving mode from the user input component, (4) setting the latch to continuously provide the first PTT signal after the selection of the transmitting mode is obtained from the user input component, and (5) resetting the latch to discontinue the first PTT signal after the selection of the receiving mode is obtained from the user input component.

12. The vehicle of claim 11 wherein the driving state includes a drivetrain of the vehicle being engaged for movement, wherein the logic controller further detects a nondriving state which includes the vehicle being parked, and wherein the push-to-talk activator is not inhibited when the nondriving state is detected.

13. The vehicle of claim 12 wherein when the logic controller detects the nondriving state then the logic controller further sets the latch and resets the latch according to the selection of the transmitting mode or the receiving mode from the user input component.

14. The vehicle of claim 11 wherein resetting the latch further comprises providing a second PTT signal from the latch to the mobile radio transceiver to select the receiving mode.

15. The vehicle of claim 11 further comprising:
a microphone;
at least one loudspeaker; and
an audio processor coupled to the microphone and the loudspeaker, wherein the audio processor is adapted to link with the mobile radio transceiver in order to reproduce a received audio signal from the mobile radio transceiver using the loudspeaker when in the receiving mode and in order to generate a transmission audio signal for the mobile radio transceiver using the microphone when in the transmitting mode.

16. A method for operating a vehicle together with an aftermarket two-way mobile radio transceiver which is connected to the vehicle, wherein the mobile radio transceiver incorporates a push-to-talk activator for selecting a transmitting mode or a receiving mode of the mobile radio transceiver, the method comprising the steps of:
detecting a driving state of the vehicle;
inhibiting the push-to-talk activator when the driving state is detected;
detecting a discontinuous trigger action of a user corresponding to a selection of the transmitting mode or the receiving mode using a user input component separate from the mobile radio transceiver;
after the selection of the transmitting mode is obtained then setting a latch to continuously generate a first PTT signal to the mobile radio transceiver; and
after the selection of the receiving mode is obtained then resetting the latch to discontinue the first PTT signal.

17. The method of claim 16 wherein the driving state includes a drivetrain of the vehicle being engaged for movement, wherein a nondriving state of the vehicle includes the vehicle being parked, and wherein the push-to-talk activator is not inhibited when the nondriving state is detected.

18. The method of claim 17 wherein when the nondriving state is detected then the latch is set and reset according to the user selection of the transmitting mode or the receiving mode.

19. The method of claim 16 further comprising the steps of:

detecting a predetermined crisis condition in a proximity of the vehicle;

alternately setting and resetting the latch at a predetermined time interval while the predetermined crisis condition continues; and including an audio announcement message identifying the predetermined crisis condition in the transmitting mode of the mobile radio transceiver.

20. The method of claim 19 further comprising the steps of:

detecting a user activity indicative of an ability to take the discontinuous trigger action to select the transmitting mode or the receiving mode; and halting the alternately setting and resetting of the latch in response to the user activity.

* * * * *